Figure 1:
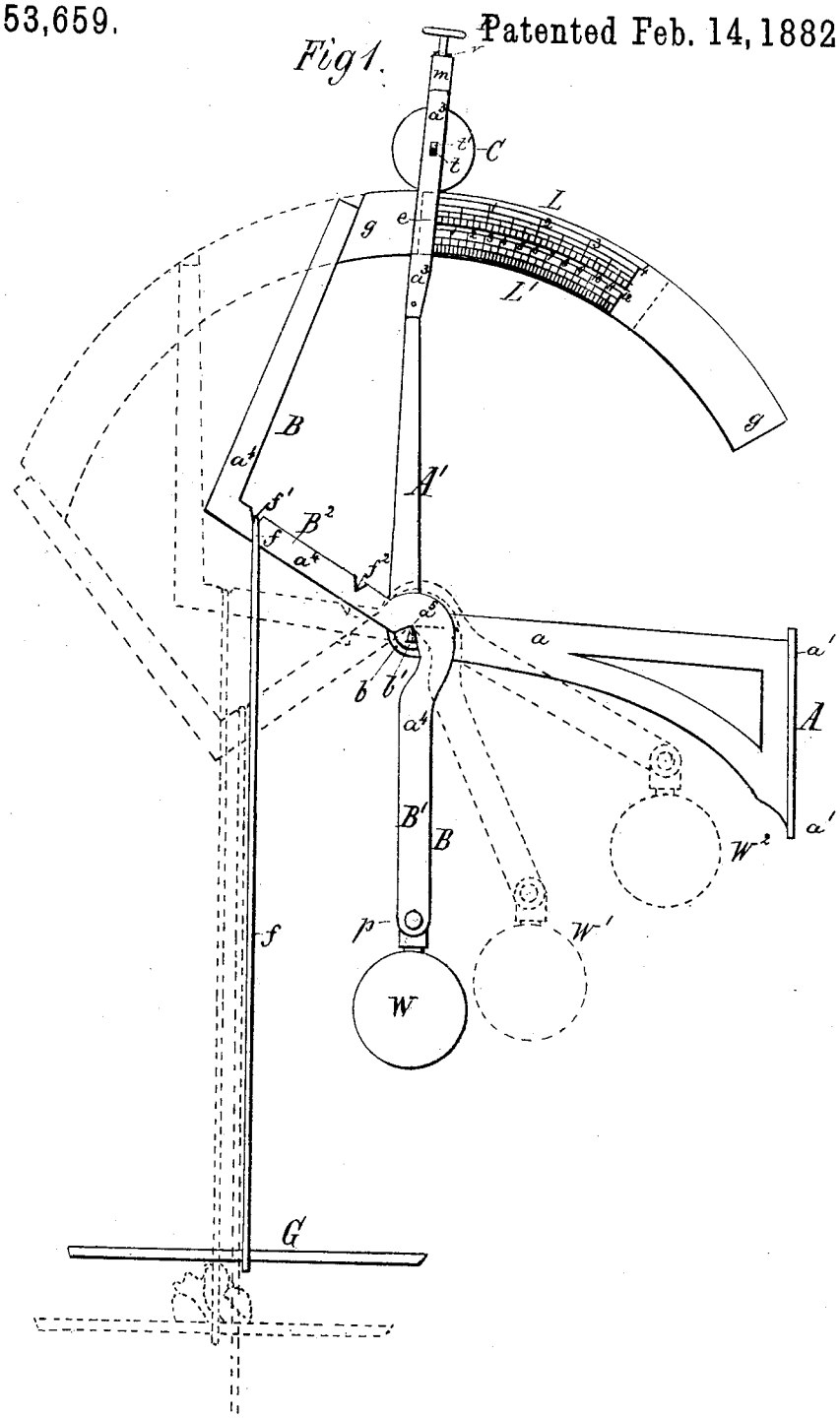

(No Model.) 3 Sheets—Sheet 1.

J. B. ATWATER.
WEIGHING SCALE.

No. 253,659. Patented Feb. 14, 1882.

Witnesses:
J. P. Theo. Lang.
Carlyle Fenwick.

Inventor:
John B. Atwater
by his atty's (No Model.) 3 Sheets—Sheet 2.
J. B. ATWATER.
WEIGHING SCALE.
No. 253,659. Patented Feb. 14, 1882.
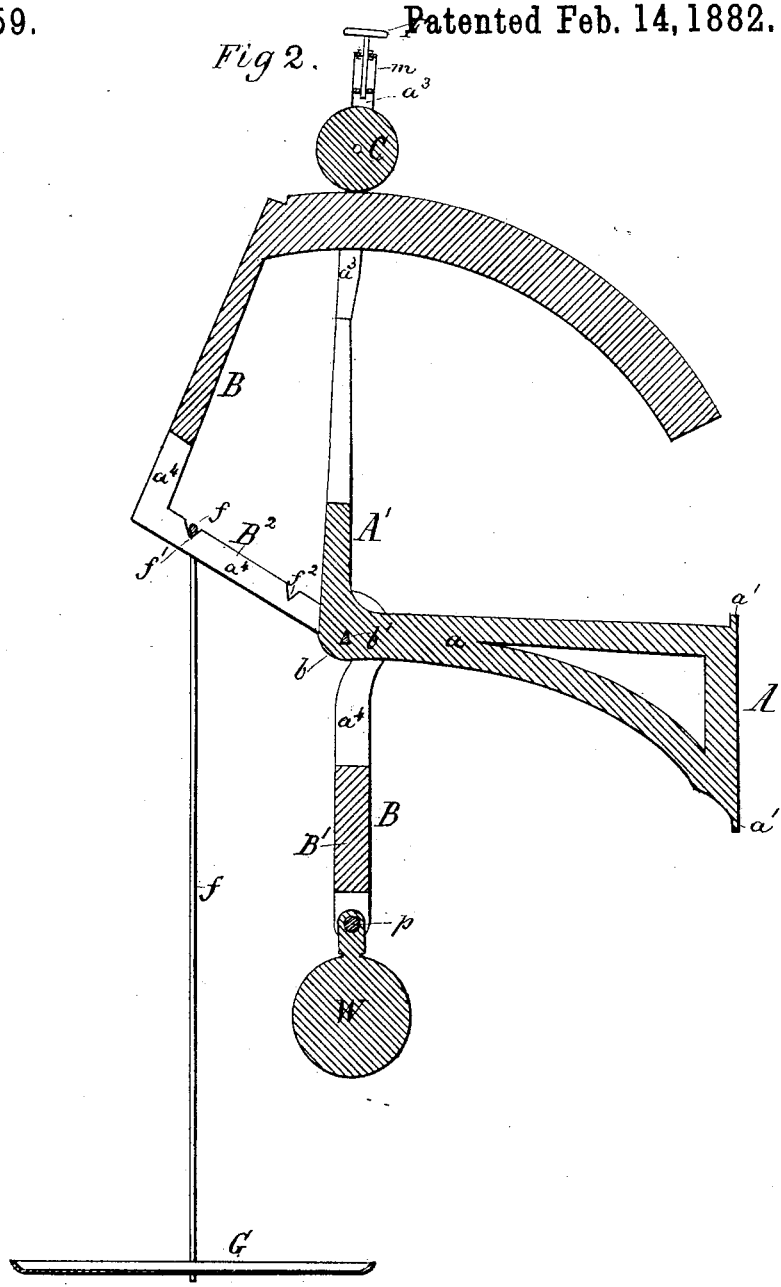
Witnesses:
J. P. Theo. Lang.
Carlyle Fenwick
Inventor:
John B. Atwater
by his atty's
Mason, Fenwick & Lawrence

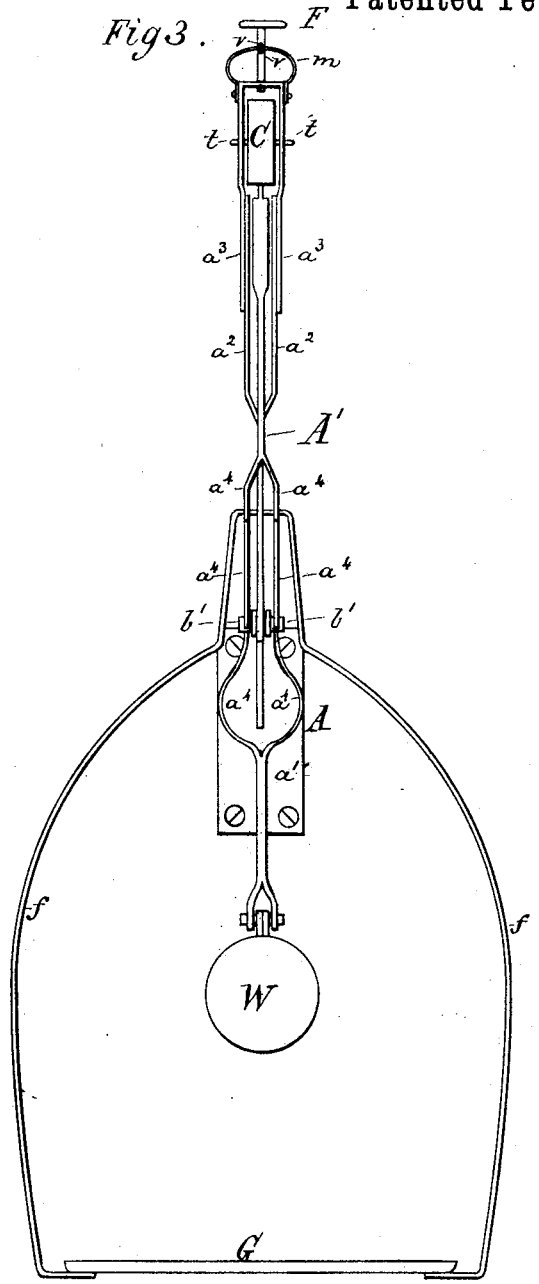

UNITED STATES PATENT OFFICE.

JOHN B. ATWATER, OF CHICAGO, ILLINOIS.

WEIGHING-SCALE.

SPECIFICATION forming part of Letters Patent No. 253,659, dated February 14, 1882.

Application filed November 12, 1881. (No model.)

*To all whom it may concern:*

Be it known that I, JOHN B. ATWATER, a citizen of the United States, residing at Chicago, in the county of Cook and State of Illinois, have invented a new and useful Improvement in Weighing-Scales; and I do hereby declare that the following is a full, clear, and exact description thereof, reference being had to the accompanying drawings and letters of reference marked thereon, forming a part of this my specification of said invention.

The object of my invention is the production of a cheap portable scale for weighing purposes, and adapted for weighing either light or heavy articles, as may be desired.

The nature of my invention will fully appear from the subjoined description when considered with reference to the accompanying drawings, forming a part of this specification.

Figure 1 of the drawings is a side elevation of my improved scale. Fig. 2 is a central vertical section of Fig. 1, and Fig. 3 is a front elevation of the scale.

In the figures, A indicates a metal plate wrought into the form shown, its rear portion or lower limb, $a$, terminating rearwardly in a broad portion, $a'$, by which it may be secured to any proper support for the weighing-scale. At $b$ the metal plate A is projected upwardly at right angles to its lower limb, $a$, thus forming an upper stationary limb, A′, and, as at $b'$, is provided with a knife-edge fulcrum-bearing, upon which a lever-beam, B, vibrates when being used when the several parts of the scale are in position, as represented in the figures. The upper portion of the limb A′ of the plate A is constructed of pieces of metal, as at $a^2$ and $a^3$, said pieces being set apart from each other, as in Fig. 3, to receive between them a steady-wheel, C, as shown, and between which pieces the scale-plate $g$ of the weighing-scale moves in the act of use. The lever-beam B also has a portion of its length composed of two pieces of metal, as at $a^4 a^4 a^4$, said pieces being spread apart a sufficient distance to afford a proper level support for the bail $f$ of the tray G in notches, as at $f'$ and $f^2$, in the upper edges of the pieces $a^4 a^4 a^4$, while the under edges of said pieces are notched, as at $a^5$, Fig. 1, and thus afford a proper seat for the knife-edged fulcrum-bearing $b'$ when the several parts of the weighing-scale are in position, as shown in the figures.

The upper portion of the lever-beam B is provided with a scale-plate, $g$, in the form of an arc of a circle, and has for its axis of oscillation the edge of the knife-edged fulcrum-bearing $b'$, on which the lever-beam B vibrates. This plate $g$ is provided with upper graduated scale-lines, as at L, and with lower graduated scale-lines, as at L′, the upper scale-lines being, for example, spaced off to indicate a weight in pounds from one to four, inclusive, and the lower lines, as at L′, to indicate a weight in pounds from one to twelve, inclusive, while the respective scale-lines L and L′ occupy the same length of the scale-plate $g$. Thus when the bail $f$ of the tray G is in the notch $f'$, as shown in Fig. 1, the weight of an article placed upon the tray which does not exceed four pounds may be indicated by the upper graduated scale-lines, L, while an article whose weight does not exceed twelve pounds, but is greater than four pounds, may be indicated by the lower graduated scale-lines, L′, when the bail $f$ of the tray is taken from the notch $f'$ and placed in the notch $f^2$ of the lever-beam B. In other words, when the tray is suspended at a point, as at $f'$, upon the upper lever-arm, B², of the lever-beam B, which point is of greatest leverage power, light articles may have their weight designated by the upper scale-lines, L, while the lower scale-lines, L′, may be made to indicate three times the weight indicated by the upper scale-lines with the same rearward movement of the scale-plate $g$ when the tray is suspended in the notch $f^2$ of the arm B², the determined leverage proportions of the weighing-scale being adapted to such scaled lines on the scale-plate $g$.

As indicated in the figures, W is a counterpoise-weight pivotally attached to the lower lever-arm, B′, of the lever-beam B, as shown, in such manner as to freely vibrate upon its pivot-pin $p$, so that whether the lever-beam B shall be in its normal position, as indicated in solid lines in Fig. 1, with the weighing-scale at rest, or thrown into the positions indicated by dotted lines in said figure, the weight W will always depend perpendicularly therefrom, as shown in dotted lines W′ W².

It will be seen that during the movements or oscillations of the scale-plate $g$ in the act of weighing, the upper limb, A', of the plate A remains stationary, the right-hand edge of the part $a^3$ serving as a pointer to indicate upon the scale-lines L and L' the weight of the article upon the tray G—that is to say, when the scaled plate $g$ comes to rest and with the right-hand edge, $e$, of the part $a^3$ exactly registering with any given scale-line, the weight of the article upon the tray G will be designated by such line, and during this act the observer need only keep his eye fixed upon the stationary pointer or edge $e$, thus relieving the eye of the observer from a confusion of vision incident to a weighing-scale in which an oscillating or vibrating pointer is utilized to indicate the weight upon a scaled plate which is stationary.

In order to give steadiness of movement to the scaled plate $g$ and prevent its vibrations in the finishing act of weighing after the tray has been loaded, and so be enabled to more quickly weigh the article placed upon the tray G, I employ a wheel, C, having its axle $t$ confined from lateral movement in elongated slots $t'$ of the parts $a^3$ $a^3$ of the upper limb, A', as shown. The periphery of this wheel travels upon the upper edge of the scaled plate $g$ with only the weight of the wheel resting thereon, and as its axle can rise and fall in the slots or openings $t'$ the wheel will accommodate itself to any inequalities in the upper edge of the scaled plate $g$, and thus remain at all times in contact therewith.

In weighing-scales in ordinary use which employ an arc or circular scaled plate, the preliminary act of loading the tray produces an annoying vibration or swinging to and fro laterally of the scale-beam and scaled plate. This I obviate by a finger-key, F, which when at rest will be held in the position shown clearly in Fig. 1. This key is passed through an arched spring, $m$, secured, as shown, to the parts $a^3$ $a^3$, which support the wheel C, and has its lower end passed through the top portion of said parts $a^3$ $a^3$, and held in such relation by pins $v$ $v$ passed through it above and beneath the spring, as indicated in the figures. By this means a pressure of the finger upon the key F will force the lower end of the key upon the wheel C, and as the tread of the wheel C upon the plate $g$ is exactly in vertical line with and above the knife-edged fulcrum $b'$, upon which the lever-beam B is suspended, such pressure will at once lock the wheel, the plate $g$, and lever-beam in a fixed position, thereby preventing the swinging or oscillating movements of the scaled plate $g$ and lever-beam B during the preliminary act of loading the tray.

It will be seen that after the tray is loaded and the finishing act of ascertaining its weight is being performed, the short, quick, and eye-confusing vibrations of the plate $g$ are prevented simply by the slight weight of the wheel C, while the greater lateral vibration or swinging of the plate and lever-beam in the preliminary act of loading the tray is effected by applying pressure to the wheel C through the key F.

In this manner I have produced a simple inexpensive weighing-scale particularly adapted for domestic use, for weighing light articles when the tray is suspended in the notch $f'$ of the lever-arm $B^2$, and heavy articles when suspended in the notch $f^2$ of said lever-arm.

What I claim as new, and desire to secure by Letters Patent of the United States in a weighing-scale, is—

1. A roller-weight, C, which is self-adjusting to and acts as a brake upon a vibrating scaled plate of a weighing-scale, substantially as and for the purpose set forth.

2. A pressure device in combination with the roller-weight C, whereby the lever-beam B and scaled plate $g$ may at will of the operator be temporarily held stationary, substantially as and for the purpose set forth.

JOHN B. ATWATER.

Witnesses:
E. T. PAUL,
F. C. GIBBS.